US006711695B1

(12) United States Patent
Burns et al.

(10) Patent No.: US 6,711,695 B1
(45) Date of Patent: Mar. 23, 2004

(54) PECL VOLTAGE DIMM WITH REMOTE MULTI-MODULE ETCH SKEW COMPENSATION

(75) Inventors: Douglas J. Burns, Westford, MA (US); Barry S. Katz, Sudbury, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 570 days.

(21) Appl. No.: 09/770,590

(22) Filed: Jan. 26, 2001

(51) Int. Cl.[7] ................................................. G06F 1/04
(52) U.S. Cl. ........................ 713/503; 713/400; 713/600
(58) Field of Search ................................. 713/400, 401, 713/500, 503, 600; 711/100, 167; 327/100, 141, 144, 146, 147, 155

(56) References Cited

U.S. PATENT DOCUMENTS

| | | | | |
|---|---|---|---|---|
| 5,394,024 A | * | 2/1995 | Buckenmaier et al. | 327/160 |
| 5,570,053 A | * | 10/1996 | Takla | 327/292 |
| 5,717,729 A | * | 2/1998 | Iknaian et al. | 375/356 |
| 5,828,871 A | * | 10/1998 | Kawaguchi et al. | 713/600 |
| 6,587,907 B1 | * | 7/2003 | Ashby | 710/300 |
| 6,618,816 B1 | * | 9/2003 | Ido et al. | 713/503 |

* cited by examiner

*Primary Examiner*—Dennis M. Butler
*Assistant Examiner*—Thuan Du

(57) ABSTRACT

A processor system, comprising a system board on which a processor, a memory logic controller, and a clock source are installed and a memory module on which a memory device and PLL clock driver are installed. The system board is configured to accept one or more memory modules. The clock signal generated by the clock source is distributed to the various devices on the system board by a clock buffer tree via equal length etch runs. The same clock signal is also propagated via a different length etch to the memory device on the memory module. Clock skew generated by these different clock etch lengths is removed by routing a carefully tuned feedback loop of the clock driver from the memory module to the system board and back to the clock driver on the memory module. The PLL performs a clock signal voltage translation from PECL to TTL voltage.

16 Claims, 5 Drawing Sheets

PECL VOLTAGE DIMM WITH REMOTE MULTI-MODULE ETCH SKEW COMPENSATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system comprising a plurality of memory modules. More particularly, the invention relates to the elimination of etch-related skew resulting from clock signal fanout across multiple modules.

2. Background of the Invention

It often is desirable to include multiple processors in a single computer system. This is especially true for computationally intensive applications and applications that otherwise can benefit from having more than one processor simultaneously performing various tasks. It is not uncommon for a multi-processor system to have 2 or 4 or more processors working in concert with one another. Typically, each processor couples to at least one and perhaps three or four other processors. To further improve performance in multi-processor systems, system designers may implement a distributed memory system. In such a system, each processor is coupled to one or more memory devices, with every processor in the system capable of accessing data from any of the memory locations.

Many modern multi-processor systems rely on a core logic chipset to direct data traffic between processors, memory, and the outside world. A conventional core logic chipset includes, among other things, a memory controller and I/O interface circuitry. Older chipsets would also control cache memory, but newer designs are delegating this role to the processors to which the cache memories are connected. Modern core logic chipsets include a number of devices, each capable of transmitting data to and from processors or memory devices. For example, the Compaq 21264 Alpha processor has employed a core logic chipset that includes ASIC chips capable of fetching and transmitting 256-bit data bundles to and from SDRAM memory arrays. High-performance Alpha systems have support for up to 32 GB or more of main memory.

The physical implementation of large memories requires a large number of memory boards and module space. To conserve space, systems with large memories are usually built using multiple memory boards that connect to a main system board. This is done to take advantage of design space in three dimensions, thus yielding a smaller physical space. In addition to occupying a large physical space, large memories also present a large fanout and large load to the clock system. Fanout refers to the distribution of a clock signal, which often originates from a common clock source, to every CPU, ASIC, and memory device in the chipset. As more memory devices, namely memory boards, are added to the system, the load on the clock source becomes greater and fanout increases as well.

Another disadvantage that arises from adding memory boards to a computer system is that clock skew becomes more difficult to manage. Skew relates to the phase and timing misalignment of the clock signal as it is received at the numerous destination devices. Ideally, the clock transitions at the various devices occur at the same time or within a specified range of time to ensure synchronous, efficient operation of the system. One of the major contributors to skew is interconnect propagation delay. Skew between the clock signals arriving at two devices increases as the difference in distance between the clock source and these devices increases. Thus, if a memory device is physically located farther from a clock source than a CPU, the clock signal will reach the CPU before reaching the memory device and skew will result. If all the devices are located on the same layer of a printed wiring board (PWB), skew may be corrected by ensuring clock etch runs are equal in length. However, as discussed above, modem systems are configured with multiple memory boards and these memory boards are typically configured to accept several memory modules themselves. In such a system, the clock signals must travel across multiple printed wiring boards (PWBs) (e.g., system board, memory board, memory module) before reaching the destination device.

FIG. 1, which shows a conventional multi-processor system with multiple memory boards 160 and Dual Inline Memory Modules (DIMMs) 170, graphically depicts this clock fanout problem. The system shown in FIG. 1 includes a system board 100, on which the CPUs 110 and core logic chips 120 are assembled. Also included on the system board is a frequency synthesizer 130 or other clock source. From this clock source, the clock signals must be fanned out to the various devices. Fanout devices 140, such as clock buffers or PLL clock drivers, are used to reproduce and distribute the incoming clock source to the various destination devices. It should be noted that FIG. 1 represents clock signals only and does not include data, command, or address paths between devices.

As discussed above, skew tends to be more problematic when clock signals are routed across multiple PWBs. Not only is there skew between the devices on the system board 100 and the individual memory devices 150, but there is also skew between memory devices 150 on different DIMMs 170. Even if clock signal trace lengths can be matched to all the memory devices 150 in the system, there is a non-negligible amount of variation in the propagation constants for the different PWBs in the signal paths. The propagation constant for any given board provides a measure of the clock delay induced as a function of the total length of clock etch on that board. This propagation constant may vary by as much as ±10% from board to board. Thus, even if identical clock traces are etched onto each of the multiple memory boards 160, a skew of up to 20 percent between the boards 160 may result. The same is true for the DIMMs 170, which are industry standard devices manufactured to a common specification.

In terms of actual numbers, the ±10% variation in propagation constant results in a possible difference of roughly 40 picoseconds per inch of clock etch between printed wiring boards. If two clock signals have to travel 30 inches from source to destination, and are routed such that they have no routing layer in common, an interconnect skew of up to 1.2 nanoseconds develops between memory devices 150 on different DIMMs 170. This interconnect skew is added to the total skew from all contributors, part of which is developed by the electrical components used to generate the clock. Given that current processor clock speeds are increasing well beyond 100 and 200 MHz (i.e., 10 nsec and 5 nsec clock periods), this skew represents a large percentage of the clock period during which commands are executed. The problem naturally gets worse as clock frequencies increase. In general, it is desirable to limit the total of all skew contributors to less than 20% of the overall clock period to improve system performance.

An additional problem arises when different clock voltages are required at the various destination devices. For example, conventional DIMMs 170 use TTL voltage inputs for their source clock while certain logic devices 120 or processors 110 use PECL voltage inputs for their source clock. TTL signals typically oscillate between nominal voltages of 0 and 3.3 volts. PECL signals, on the other hand, oscillate between 1.5 volts and 2.5 volts. In each case, the lower voltage represents a binary zero and the higher voltage represents a binary one. In order to successfully use devices with different input voltage requirements, translators are used to convert one signal type to another. The translator may be a PLL clock driver that distributes and translates the clock signal voltages. In general, a TTL clock will yield larger skews than a PECL clock because of the large switching region of the TTL logic. While the rest of the chipset 300 can benefit from the low skew PECL clocks, the clocks to the memory devices 150 must be translated from PECL to TTL voltage levels. Additionally, the insertion of a translator in the clock signal paths injects additional delay to the clock system. An improved clock distribution system will preferably allow system designers to deliver PECL voltage signals to memory DIMMs to reduce signal-induced skew and eliminate the skew that is generated by a translator that is normally required to convert the clock signal to TTL voltage levels.

It is desirable therefore, to develop a clock distribution scheme that successfully eliminates skew that results from differences in clock trace lengths and also from differences in PWB signal propagation constants. The clock distribution system also preferably permits PECL voltage DIMMs. Implementation of the clock distribution scheme may advantageously allow reliable data transfer between devices while minimizing latency and skew and maximizing bandwidth. The transmission scheme may also indirectly improve the manufacturability of printed wiring boards and memory hardware by easing the requirements for equal-length clock paths.

BRIEF SUMMARY OF THE INVENTION

The problems noted above are solved in large part by a clock distribution scheme for use in a system comprising a plurality of memory devices. The distribution scheme may be implemented in a computer processor system comprising a system board on which a processor, at least one memory logic controller, and a clock source are installed. The system also includes a memory module, or DIMM, on which at least one memory device and one PLL clock driver are installed. The system board is configured to accept one or more DIMMs. The clock signal generated by the clock source on the system board is distributed to the various devices on the system board by a clock buffer tree. The clock signal etch runs leading to each of the devices are preferably of equal length. The same clock signal is also propagated via a different length etch to the memory device on the DIMM. Clock skew generated by these different clock etch lengths is removed by routing the feedback loop of the clock driver from the DIMM to the system board and back to the clock driver on the DIMM. The total length of etch for the clock driver feedback loop is substantially equal to the difference in length between the clock etch leading to the devices on the system board and the etch leading to the memory device on the DIMM. The portion of the feedback loop added to the DIMM is substantially equal to the length of clock signal etch on the DIMM leading to the memory device.

The balance of the feedback loop etch is added to the system board for two reasons. First, the skew caused by any difference in the clock signal path lengths leading up to the memory module must be eliminated. Second, the feedback loop is routed to the system board so that the feedback loop experiences the same propagation delay for this portion of the loop as the clock signal leading up to the memory module.

Additionally, the phase-locked loop clock driver on the memory module performs a clock signal voltage translation from PECL to TTL voltage. This allows the clock signals to remain at PECL voltage levels through the transition to the memory module.

The clock distribution scheme may be extended to multiple boards and need not be limited to memory clock distribution systems.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

The term "latch" and "flip-flop", particularly a D flip-flop, are synonymous and refer to a logic device that samples an incoming digital signal and outputs the value of the input bit at a clock edge.

DETAILED DESCRIPTION OF THE PREFERRED EMBODIMENTS

Figure 2A:
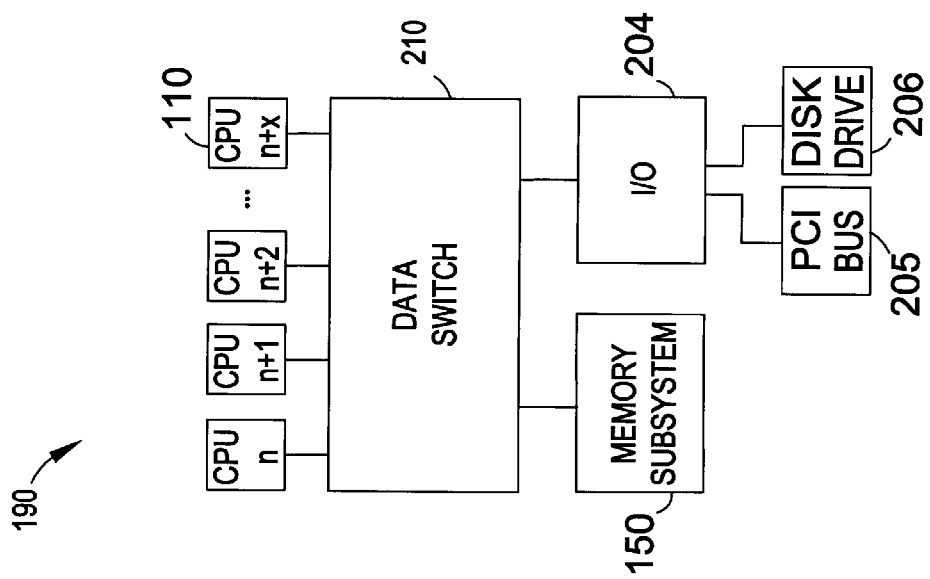
FIG. 2a shows a diagram of a preferred multi-processor computer system in which the preferred embodiment may be implemented.

In accordance with the preferred embodiment of the invention, the skew elimination scheme described herein may be implemented in a computer system 190 as shown in FIG. 2a. The computer system 190 is a multi-processor system comprising any number of processors 110. Each processor is preferably coupled to a data switch 210, which successfully implements a switch fabric connection between the processors 110, a memory 150 and an input/output (I/O) controller 204. For each interconnection between the data switch 10 and the other devices, data is transmitted with a forwarded clock and the data switch 210 implements the preferred clock forwarding scheme described in detail below.

In further accordance with the preferred embodiment, the I/O controller 204 provides an interface to various input/output devices such as an expansion bus such as a PCI Bus 205 or disk drive 206 as shown. The memory 150 preferably comprises SDRAM memory devices, but other types of memory devices can be used if desired. The capacity of the memory devices 150 can be any suitable size. Further, memory devices 150 preferably are implemented as Dual Inline Memory Modules (DIMMs).

Figure 2B:
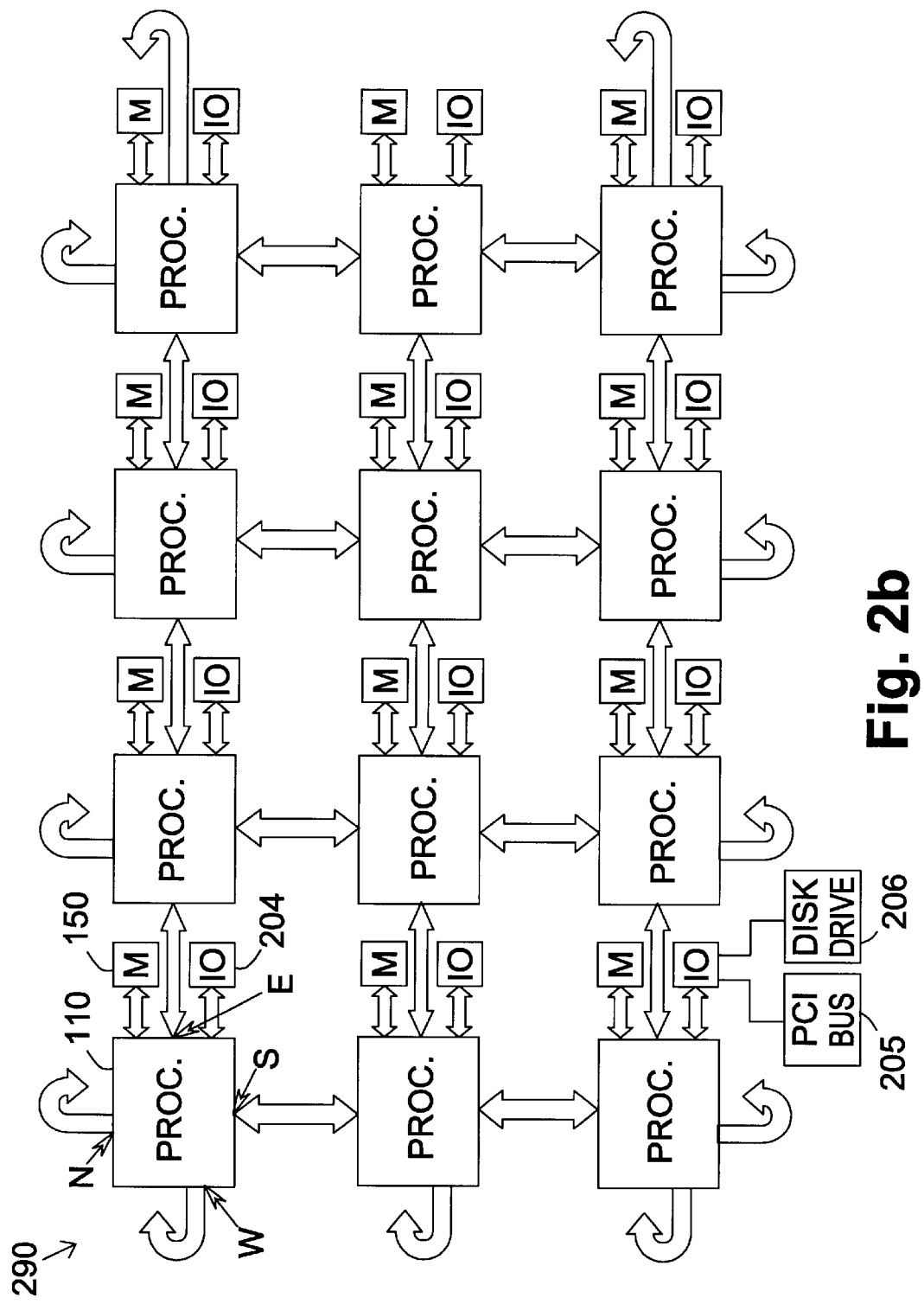
FIG. 2b shows a diagram of an alternative multi-processor computer system in which the preferred embodiment may be implemented.

The preferred skew elimination scheme described herein may also be implemented in a multi-processor system of the type shown in FIG. 2b. In FIG. 2b, the computer system 290 comprises one or more processors 110 coupled to a memory 150 and an I/O controller 204. Each processor preferably includes four ports for connection to adjacent processors. The inter-processor ports are designated "north," "south," "east," and "west" in accordance with the well-known Manhattan grid architecture. As such, each processor 110 can be connected to four other processors. The processors on both ends of the system layout wrap around and connect to processors on the opposite side to implement a 2D torus-type connection. Although 12 processors 110 are shown in the exemplary embodiment of FIG. 2b, any desired number of processors (e.g., 256) can be included. Furthermore, while the computer systems 190, 290 shown in FIGS. 2a and 2b portray a multi-processor system, the preferred embodiment may also be successfully implemented in a single-processor computer system.

In general, computer system 290 can be configured so that any processor 110 can access its own memory 150 and I/O devices as well as the memory and I/O devices of all other processors in the network. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors. Thus, data from I/O devices may enter the 2D torus via any of the I/O controllers 204.

Figure 1:
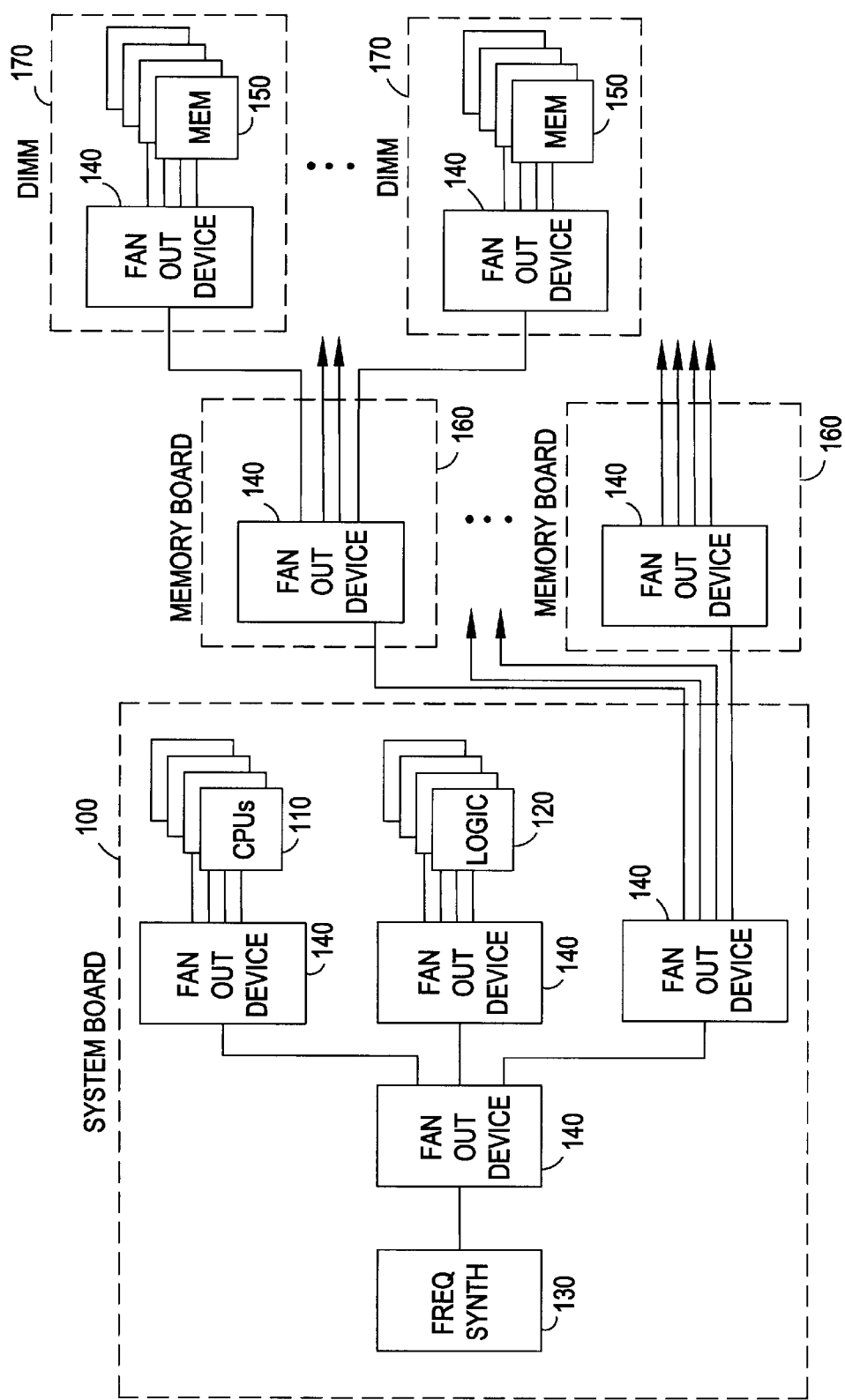
FIG. 1 shows a graphical depiction of the clock fanout required in a conventional multi-processor system with multiple memory boards and memory modules.
Figure 3:
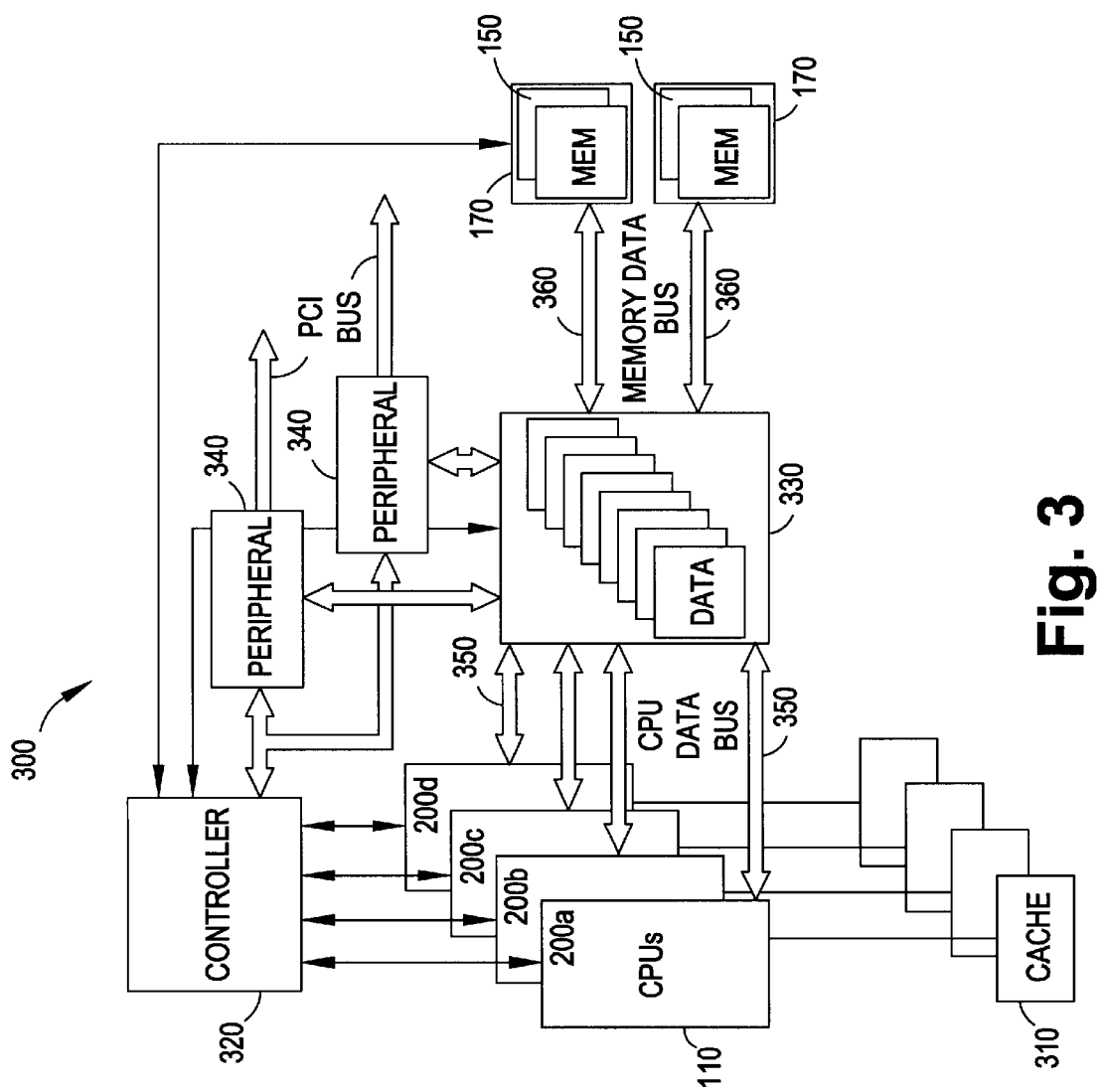
FIG. 3 shows a detailed diagram of the multi-processor chipset of the system in FIG. 1.

The multi-processor network shown in FIG. 2a may preferably be embodied in a core chipset 300 as shown in FIG. 3. FIG. 3 shows the command, data, and address path flows through a chipset in accordance with the preferred embodiment of the invention. The multi-processor architecture is implemented in a chipset 300 to accommodate the large amount of logic required as well as the large number of I/O pins required to support the wide buses between devices. In FIG. 3, the computer system comprises four processors (CPUs) 110, each with an associated data cache 310. The preferred embodiment shown in FIG. 3 also includes logic devices (120 in FIG. 1) operating as controller devices 320, data handler devices 330, or peripheral interface devices 340. The controller device 320, data handler devices 330, and peripheral interface devices 340 are preferably embodied as ASIC chips, but may also be suitably implemented as FPGA devices or other types of logic circuits or devices.

The controller device 320 is responsible for control of the I/O and memory subsystem. The controller device 320 issues commands and addresses to the data handler devices 330 and peripheral interface devices 340, which are then responsible for actual data transfer. Each controller device 320 also provides address ports to access the CPUs 110.

The peripheral interface devices 340 provide I/O interface between the chipset 300 and external devices. The peripheral interface devices 340 communicate with the controller device 320 and data handler device 330 and provide fully independent PCI compliant buses. The PCI buses may preferably be coupled to external I/O devices such as PCI slots, ISA slots, and system I/O such as a mouse, keyboard, and disk drives, and one or more expansion board slots. Each peripheral interface device 340 supports a variety of transfers, including DMA and PCI to PCI transfers. The peripheral interface devices 340 are controlled by the controller device 320 and all data transfers to or from the chipset 300 are performed through the data handler chips 330. Thus, the tasks described above for the I/O controller 204 depicted in FIG. 2a are actually performed via the combination of the controller devices 320, data handler devices 330, and peripheral interface devices 340.

The data handler devices 330 are responsible for all data movement between the processors 110 and memory 150 and peripheral interface devices 340. Each data chip 330 is coupled to memory devices 150 via a pair of memory data buses 360. The preferred embodiment uses SDRAM DIMMs 170 and four DIMMs 170 form a single memory "array". In the preferred embodiment, the memory 150 is physically implemented in 32 separate memory modules (DIMMs) 170 distributed equally among four memory boards 160.

Each data chip 330 also has four data bus ports for transmitting data along a CPU data bus 350 to four separate processors 110. The data handler devices 330 also contain a set of queues and accumulators to support DMA operations, buffering, and memory accumulation to allow full bandwidth transfers from a pair of memory buses 360 to a single CPU 110. The data handling device 330 preferably implements a switched architecture which allows multiple, concurrent, point-to-point transactions between devices in the chipset 300. In the preferred embodiment, all devices shown in FIG. 3 except the memory devices 150 may operate using PECL voltage clock signals. The individual memory devices 150, however, operate using TTL voltage clock signals.

Figure 4:
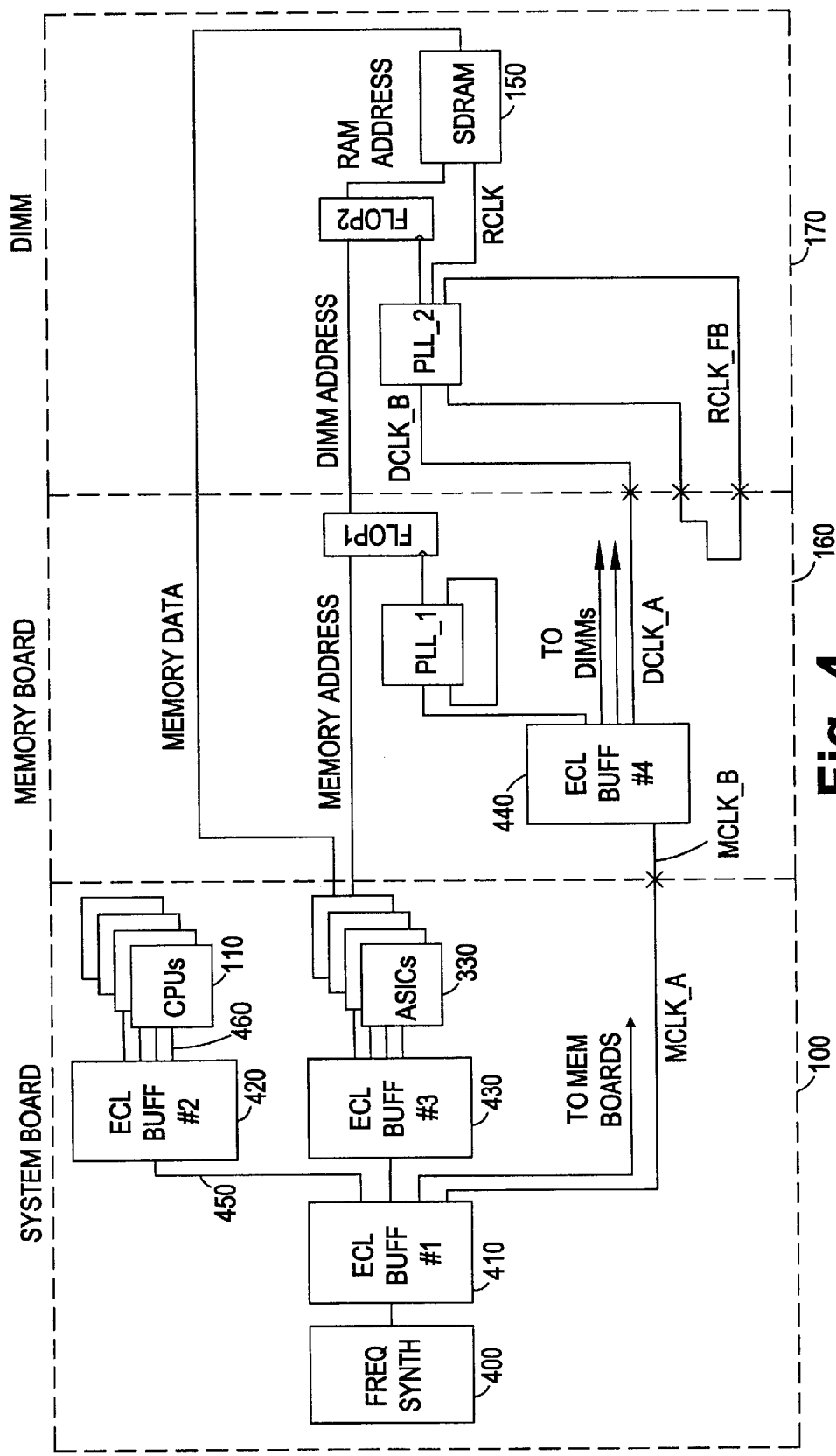
FIG. 4 shows a schematic representation of the preferred embodiment of the skew-eliminating, clock distribution scheme.

Referring now to FIG. 4, a clock distribution system is shown that delivers PECL voltage clock signals to the CPUs 110, the data handling ASICs 330, and the memory DIMMs 170. The PECL clock signals are translated to TTL by PLL_2 on the DIMM 170 before proceeding to the SDRAM memory device 150. Thus, clock signal DCLK_B is a PECL voltage signal and RCLK is a TTL voltage signal. Note that FIG. 4 represents only a schematic representation of a portion of the chipset 300. The core chipset comprises additional devices as discussed above, but these devices have been omitted from FIG. 4 for clarity. In addition, unless otherwise labeled, the signals shown in FIG. 4 are clock signals. Further, no specific board layout design should be inferred from the relative positions of the ASIC 330, processors 110, memory board 160, or DIMMs 170 shown in FIG. 4.

The clock distribution system shown in FIG. 4 offers several advantages. First, the system effectively eliminates skew caused by the differing clock signal path lengths between the ASIC 330 and the SDRAM 150. Second, the system accounts for skew caused by variations in propagation constant between the PWBs. Third, the system permits the use of PECL voltage DIMMs, which permit the transmission of lower-skew PECL voltages for a longer portion of the memory clock path.

FIG. 4 includes a system board 100, a memory board 160, and a DIMM 170. A frequency synthesizer 400 generates the main clock that is fed to an PECL buffer tree 410 to generate a plurality of clock signals. The clock signals generated by this first PECL buffer tree 410 are transmitted to PECL buffer tree #2 420, PECL buffer tree #3 430, and to the interface between the system board 100 and the memory board 160. The clock signals generated by PECL buffer tree #2 420 are transmitted to each of the plurality of CPUs 110. Similarly the clock signals generated by PECL buffer tree #3 430 are transmitted to each of the plurality of ASICs 330. To eliminate skew caused by differing clock signal lengths, the clock etch for each clock signal path on the system board are matched. The etches are matched for all clock signals transmitted to each of the CPUs 110 and ASICs 330 as well as the etch for the clock signals transmitted to the memory board. Thus, the length of etch labeled MCLK_A is matched to the sum of the etch 450 between PECL buffer trees #1 and #2 and the etch 460 between PECL buffer tree #2 and the CPUs.

The clock signal transmitted along MCLK_A is then delivered to the memory board 160 where it traverses along MCLK_B to PECL buffer tree #4 440. In the preferred embodiment, each memory board 160 can hold up to 8 DIMMs 170. The clock signals for each of these DIMMs is generated and propagated from the PECL buffer tree #4 440. PECL buffer tree #4 440 is of the same type as PECL buffer trees #2 420 and #3 430. Thus, the same amount of component delay is inserted into the memory clock path as the clock paths for the CPUs 110 and ASICs 330 (neglecting output to output skew within each buffer tree and part to part variations between the buffer trees).

Included on the memory board 160 is a PLL clock driver PLL_1, that performs a voltage translation and fans out the converted clock signals to a series of flip-flops FLOP1. Each of these flops FLOP1 latches the memory address information that is transmitted from the data handling ASICs 330 to the memory devices 150. Whereas the memory address data is latched on the memory board 160 for translation to the appropriate DIMM 170, the memory data is passed directly through the memory board 160 to the DIMM 170. Clock driver PLL_1 is used in conventional clock systems to perform the voltage translations (PECL to TTL) for the memory device clock signals. In the preferred embodiment, PLL_1 is removed from the critical clock signal path. The address path is less critical than the clock path and can tolerate the uncertainty, phase offset and jitter introduced by PLL_1. These PLL delays are removed from the memory device clock path and therefore, the only delays incurred on the system board are those caused by the length of etch MCLK_B and DCLK_A. The compensation of these delays is discussed below.

As discussed above, the memory device clock signal is not translated to TTL voltage levels on the memory boards as it is done in conventional systems. The conversion is performed by clock driver PLL_2, which is located on the DIMM 170. The converted (TTL) clock signal is then transmitted along etch RCLK to the SDRAM memory device 150. A PLL is used because of its inherent ability to remove delays and align the phase of signals. PLL_2 includes a feedback loop, which when carefully tuned, is capable of eliminating delay generated by signals travelling to and from the PLL. Thus, the length of etch RCLK_FB is carefully tuned to match the length of RCLK+DCLK_A+DCLK_B+MCLK_B. By tuning the length of RCLK_FB in this manner, the propagation delays generated on the system board 160 and the DIMM 170 are removed.

It should be noted however, that not all of the etch RCLK_FB in the preferred embodiment is located on the DIMM 170. If all of the feedback loop is located on the DIMM 170, there will be some uncertainty caused by the difference in propagation constants between the DIMM 170 and the memory board 160. Thus, the RCLK_FB etch is actually routed off the DIMM 170 and back onto the memory board 160. By adding a portion of RCLK_FB equal to the lengths of RCLK+DCLK onto the DIMM 170 and adding the portion of RCLK_FB equal to the length of DCLK_A+MCLK_B onto the memory board 160, the same propagation constants are seen by the feedback loop and the clock signal etch and the correct amount of delay is removed from the clock signal.

It should be noted that the feedback loop for the clock driver PLL_2 described above may be extended beyond the DIMM 170 and memory board 160 and onto the system board. If it were the case that the length of clock etch MCLK_A could not be made the same length as, for example, etches 450 and 460, the skew generated by this difference in length could be eliminated by extending the feedback loop to the system board and including a length of etch equal to this difference in the feedback loop. The concept may therefore be extended to a plurality of boards and need not be limited to two boards as described in the preferred embodiment above.

Thus, by removing all propagation delays and by translating the clock signal voltages on the DIMM 170, the unwanted skew is drastically reduced. The preferred embodiment permits synchronous operation of the CPUs 110, ASICs 330, and memory devices 150. In addition, the memory clock signal can remain at the more efficient PECL voltage level for a longer duration.

The above discussion is meant to be illustrative of the principles and various embodiments of the present invention. Numerous variations and modifications will become apparent to those skilled in the art once the above disclosure is fully appreciated. For example, the teachings herein may be extended to a system where clock signals with different voltage levels are used. The teachings herein are not limited to use with TTL and PECL signals only. On the contrary, the preferred embodiment may be implemented across a variety of clock distribution systems where multi-board skew and clock voltage translator skew must be reduced. It is intended that the following claims be interpreted to embrace all such variations and modifications.

What is claimed is:

1. A computer processor system, comprising:
   at least one input/output device coupled to at least one processor;
   a system board on which the processor, at least one memory logic controller, and a clock source are installed; and
   a memory module on which at least one memory device and one phase-locked loop clock driver are installed;
   wherein the clock signal generated by the clock source is propagated via substantially equal length etch runs to the devices on the system board and is also propagated via a different length etch to the memory device on the memory module; and wherein clock skew generated by the difference in propagation time required for the clock signal to reach the devices on the system board versus the memory device on the memory module is removed by routing the etch for the feedback loop of the clock driver from the memory module to the system board and back to the clock driver on the memory module.

2. The computer system of claim 1 wherein:

the total length of etch for the clock driver feedback loop is substantially equal to the difference in length between the clock etch leading to the devices on the system board and the etch leading to the memory device on the memory module.

3. The computer system of claim 2 wherein:

the portion of the feedback loop added to the memory module is substantially equal to the length of clock signal etch on the memory module leading to the memory device.

4. The computer system of claim 3 wherein:

the balance of the feedback loop etch is added to the system board and is substantially equivalent to the difference in length between the etch leading to the devices on the system board and the portion of the memory device clock signal etch on the system board leading up to the memory module.

5. The computer system of claim 1 wherein:

the phase-locked loop clock driver on the memory module performs a clock signal voltage translation.

6. The computer system of claim 5 wherein:

the voltage translation is from PECL voltage to TTL voltage.

7. The computer system of claim 1 wherein:

the clock signal generated on the system board is distributed to the various devices by a clock buffer tree.

8. A clock distribution system, comprising:

a first circuit card assembly (CCA) on which a clock source, at least one clock buffer tree, at least one data processor and at least one data logic device are installed; and at least one second CCA on which at least one phase-locked loop clock driver and at least one memory device are installed;

wherein the first CCA is configured to accept a plurality of second CCAs; and wherein the clock buffer tree distributes the clock signal from the clock source to the data processors and data logic devices via substantially equal length clock signal etches; and wherein the clock buffer tree also distributes the clock signal to the clock drivers on the second CCA, which in turn distribute the clock signal via substantially equal length clock signal etches to the memory devices; and wherein clock skew between the clock signals arriving at the memory devices and the clock signals arriving at the processors and logic devices is eliminated by matching the length of a feedback loop on the clock driver to the difference between the length of clock etch leading to the memory devices and the length of clock etch leading to the processors and logic devices.

9. The clock distribution system of claim 8, wherein:

the clock driver on the second CCAs perform a clock signal voltage translation from PECL to TTL voltage.

10. The clock distribution system of claim 8, wherein:

the feedback loop signal from the clock driver is routed from the second CCA to the first CCA and back to the same clock driver on the same second CCA to account for possible differences in propagation constants between the first and second CCAs.

11. The clock distribution system of claim 10, wherein:

the length of feedback loop etch on the second CCA is substantially equal to the length of clock signal etch on the second CCA; and the length of feedback loop etch on the first CCA is substantially equal to the difference in length of clock signal etch leading to the data processor or data logic device and the length of clock signal etch leading to the second CCA.

12. A method of reducing clock skew in a clock distribution system, comprising:

distributing a clock signal from a clock source using a clock buffer;

routing clock signals from the buffer to other devices on the same board on substantially equal length etch runs;

routing a clock signal from the buffer to a PLL clock driver on a second board;

routing clock signals from the PLL clock driver to other devices on the second board via substantially equal length etch runs;

matching the length of a feedback loop on the PLL clock driver to the difference in length between the clock etch runs leading to the devices on the separate boards; and routing the feedback loop onto both boards to compensate for the difference in propagation constants between the boards.

13. The method of claim 12, further comprising:

matching the length of feedback loop etch on the second board to the length of clock etch on the second board.

14. The method of claim 12, further comprising:

using the PLL clock driver to perform a voltage conversion of the clock signal.

15. The method of claim 13, further comprising:

inserting additional clock buffers as necessary to further distribute the clock signal; and inserting the same number of clock buffers along every clock path.

16. The method of claim 13, further comprising:

compensating for additional boards in the system by adding feedback loop etch to each intermediate board on which additional clock etch is added to the clock distribution path.

* * * * *